June 30, 1964
E. L. PARR
3,139,546
OSCILLATING SOLENOID MOTOR
Filed Aug. 7, 1961
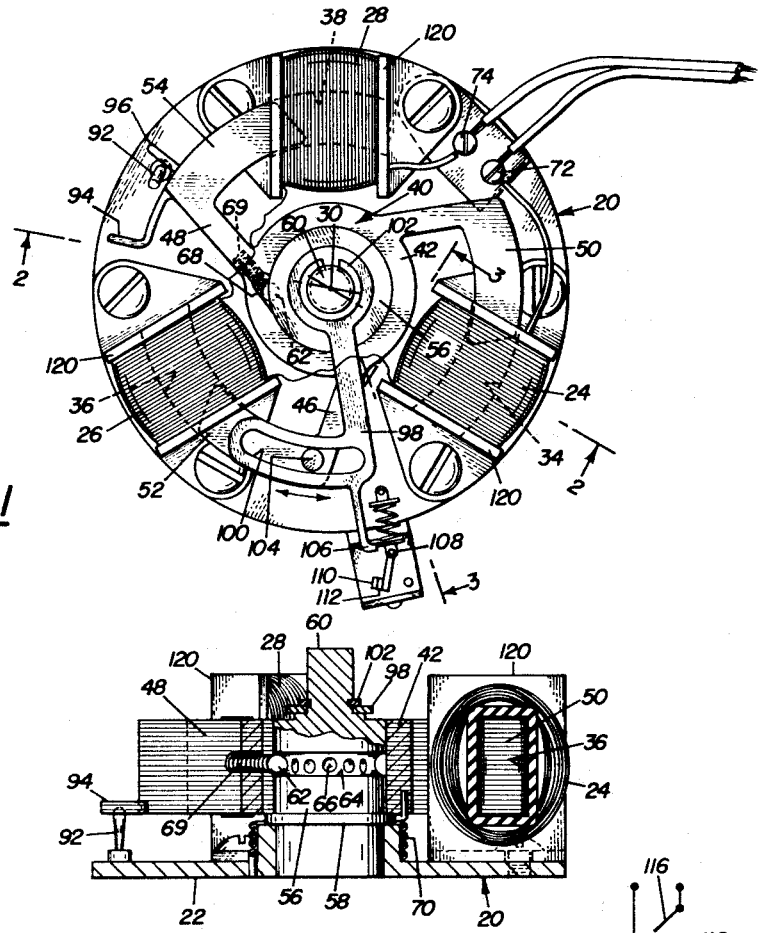
Fig.1
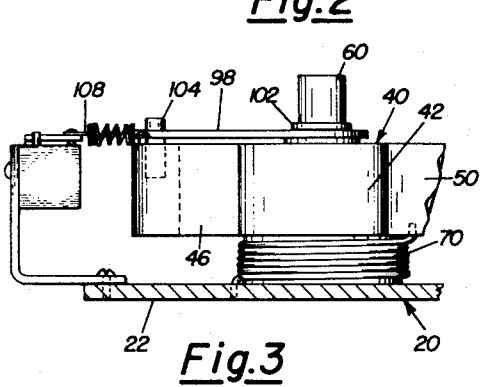
Fig.2
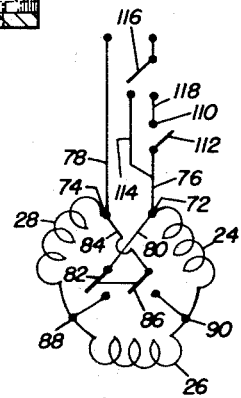
Fig.3
Fig.4
INVENTOR.
EDWARD L. PARR
BY *Jularider, Mattingly and Huntley*
ATTORNEYS United States Patent Office 3,139,546
Patented June 30, 1964

3,139,546
OSCILLATING SOLENOID MOTOR
Edward L. Parr, El Cajon, Calif., assignor to Kinning Systems, Incorporated, El Cajon, Calif., a corporation of California
Filed Aug. 7, 1961, Ser. No. 129,299
6 Claims. (Cl. 310—39)

The present invention relates to an oscillating type solenoid and particularly to an oscillating type solenoid which functions as a motor.

The oscillating type solenoid comprises a base or support, an electromagnetic coil having an arcuately shaped opening for receiving a core arm and an arcuately shaped core arm in mating relationship with the arcuately shaped opening in the coil. One of these elements, and preferably the core arm, is pivotally mounted on the base.

More specifically the solenoid includes a plurality of coils and a like member of core arms. These core arms are formed as a simple element and each arm is in mating relationship, respectively, with an opening in a coil. All of these coils are energized and de-energized simultaneously.

When the oscillating solenoid functions as a motor, the movable element, preferably the element having core arm or core arms is moved in one direction when the coil or coils are energized and are moved in the opposite direction when the coil or coils are de-energized. An overrunning clutch is interposed between the movable element and a rotatable member, which, upon oscillatory movement of the movable element progressively rotates the rotatable member in step by step action.

Also in the preferred embodiment the core is formed of laminated ferrous metal.

The step by step movement can be automatic in operation, and to effect such automatic operation, the circuit to the coil or coils is interrupted when the movable element has reached at or near its fully attracted position and the circuit is again completed when the movable element has reached at or near its fully retracted position.

In the preferred embodiment of the invention, at the time of energization of the coils, they are connected in parallel circuit relation, and after a predetermined movement of the movable element, the coils are connected in series circuit relationship.

The advantages will be apparent from the following description, references being had to the accompanying drawings wherein a preferred embodiment of the invention is illustrated.

In the drawings:

FIG. 1 is a top plan view of the oscillating solenoid in the form of a motor;

FIG. 2 is a section view of the motor taken substantially along line 2—2 of FIG. 1;

FIG. 3 is a fragmentary section view, taken substantially along line 3—3 of FIG. 1; and FIG. 4 is a wiring diagram of the motor.

Referring more in detail to the drawing, the motor 20 includes a base 22 which supports an electromagnetic coil element and an armature element. One of these elements is fixed to the base and the other is pivotally mounted on the base. In the preferred embodiment, the electromagnetic coil element is fixed to the base and the armature element is pivotally mounted.

The electromagnetic coil element includes a plurality of electromagnetic coils, preferably three indicated at 24, 26, and 28 equally spaced in a circle about a common center 30. Each of these coils is provided with an arcuately shaped opening for receiving, respectively, a core arm of an armature. These arcuately shaped openings are indicated at 34, 36, and 38 and the axes thereof are at the center 30. Preferably these openings lie between the same planes.

The armature 40 comprises a hub 42, three equally spaced and outwardly extending arms 44, 46, and 48, which carry the armature core arms 50, 52, and 54, respectively. These arms are arcuately shaped, the axis therefore being common to the axis of the coil openings, namely at 30. These arms are arranged to oscillate within the openings of the coils. The armature 40, including the hub, the arms 44, 46, 48, 50, 52, and 54 are a single integral structure formed of laminate of soft iron.

The hub 42 of the armature 40 is rotatably carried by an axle 56 in the form of a rotatable member which rests upon a block 58. The block is suitably fastened to the base 22. Any suitable means may be employed for limiting axial movement of the axle 56. A drive shaft 60 is fixed to the axle 56.

The axle 56 and shaft 60 are rotated by oscillation of the armature through an overrunning clutch formed by the axle 56, the hub 42 of the armature and a hardened steel ball 62. An annular groove 64 is formed in the periphery of the axle and socket 66 extends inwardly of the groove. Each of these sockets 66 is in the form of a hollow segment of a sphere for receiving the ball 62. The ball extends radially outwardly of the groove 64 and into a notch 68 formed in the inner surface of the hub 42. This is of varying depth that when the ball 62 is in the outer position, there is a clearance between it and the wall of the notch and the periphery of the groove, whereby, for example, when the armature can move counterclockwise without pinching the ball between the enlarged upper portion of the notch and the periphery of the groove. However, the notch narrows in width downwardly and to such extent that when the armature moves in a clockwise direction, the ball will also be moved in the same direction. The ball in moving in a clockwise direction is pushed inwardly, by the inwardly slanting wall of the notch, into one of the sockets 66, causing the axle 56 to be moved to a clockwise direction. Any desired number of sockets 65, within limits, can be provided. The ball is urged inwardly by a spring 69. In the present embodiment, twelve such sockets are provided.

The armature is returned to non-attracted position by a spring 70. This spring is shown as a coil type surrounding the cylindrical block 58. One end of the spring is fastened to the base 22 and the other end is fastened to the hub 42 of the armature.

The electromagnetic coils may be connected in series or parallel circuit relation. The electric terminals are indicated at 72 and 74.

Referring now to FIG. 4, showing a wiring diagram of a preferred manner of energizing the motor 20, current either alternating or direct is connected to terminals 72 and 74 by wires 76 and 78, respectively. The coils are adapted to be connected in series circuit relation as shown, or in parallel circuit relation by cross over a conductor 80 including a switch 82 and a conductor 84 including switch 86. Conductor 80 connected with contact 72 and with a terminal 88 disposed between coils 26 and 28 and conductor 84 is connected with terminal 74 and a terminal 90 disposed between coils 24 and 26.

When contacts 82 and 86 are closed, the coils are connected in parallel circuit relation. In the operation which follows closing of line switches 116 and 112, the impulse imparting coils 24, 26, 28 are first connected in parallel across the line and, after their three coil cores have moved two thirds of their total attracted movement, that parallel connection is changed to a series connection of the coils across the line. This is accomplished through a toggle switch arm 92 which lies in the path of movement of two fingers 94 and 96 which are moved with the armature core. Finger 94, upon engaging the toggle switch arm 92, will open switches 82 and 86 as the core moves clockwise, and finger 96, upon engaging the toggle switch arm 92 will close switches 82 and 86. Thus it is apparent that more power is available where desired, namely when it is necessary to overcome the inertia imposed on the armature core at the start of the cycle of operation thereof and through the heaviest load thereon. The thereafter use of the series circuit relation provides for cooler operation of the motor.

Too, by employing a laminated iron core, the present motor is fully capable of successful operation on alternating current.

The step by step operation i.e. the oscillation of the core can be effected automatically, thereby interrupting the flow of current to the coils and energizing the coils, alternately. For this purpose, there is provided an oscillatable arm 98 having an arcuately shaped slot 100. This arm is pivotally mounted for oscillation on the axle 56 and held in place by a spit ring 102. The axis of the slot 100 is at 30. This slot receives an upwardly extending pin 104 carried by the core 52. Arm 98 is provided with a finger 106 and is arranged to actuate a toggle switch 108 including contacts 110 and 112. As the armature is moved clockwise to substantially its full stroke in that direction, the pin 104 will engage the wall defining the left end of slot 100 and move the arm 98 to snap the contact 112 away from contact 110 to thereby open the circuit to the coils. Conversely, when the armature is moved counterclockwise to substantially its spring detracted positions pin 104 will engage the wall defining the right end of slot 100 to snap contact 112 onto contact 110 to close the circuit to the motor.

This circuit arrangement is shown diagrammatically in FIG. 4. If manual control is desirable, a conductor is employed, paralleling the switch contacts 110 and 112. Such parallel conductor is shown at 114. A manually actuated switch 116 is employed for opening and closing the circuit through conductor 114 and which all can be used for closing the circuit through the conductor 118 leading to contact 110.

The base 22 and the armature are formed of iron, and the bearing block 58 and the axle 56 are formed of ferrous metal. Also the terminal ends 120 of the coils, i.e. the end of the coils opposite the mouth or core receiving ends of the coils are formed of soft iron and therefore function os induction blocks. When the core arm contacts these induction blocks 120, each completes a magnetic loop, resulting in cooler operation of the motor and effects more holding power when using alternating current.

Thus it will be seen from the foregoing that the multiple coil and multiple armature core provides a relatively powerful solenoid which can be encompassed in a relatively small space. This oscillating type solenoid lends itself readily to form a step by step rotating motor.

While the form of embodiment herein shown and described constitute a preferred form, it is to be understood that other forms may be adopted falling within the scope of the claims that follow.

I claim:

1. A solenoid, comprising in combination, a base; an electromagnetic element including a plurality of electromagnetic coils, each coil having an arcuately shaped opening for a core arm; a single element having a plurality of arcuately shaped core arms, the arcuate shape of the openings in the coils and the arcuate shape of the arms being substantially about the same center, one of said elements being fixed to the base; pivotal means for supporting the other of said elements on the base in mating relationship of the arms and openings, said other element being movable about said pivotal means in one direction when the coils are energized and released for movement in the opposite direction when the coils are de-energized; and means actuated by the movements of said other element and while said other element is moving in the first mentioned direction for changing the coil element connections from parallel circuit relation to series circuit relation.

2. A solenoid as defined in claim 1, in which the coils are fixed to the base and the pivotal means is for the second mentioned element.

3. A solenoid as defined in claim 1, in which the core arm element is formed of laminated iron.

4. A solenoid comprising in combination:
(A) A base;
(B) an electromagnetic coil element;
(C) an armature element disposed in cooperative relationship with the electromagnetic element, one of said elements being fixed to the base and the other element being movable relative to the base and in cooperative relationship with said one element;
(D) switch means for connecting the coil element with a source of current;
(E) means on the movable element and actuated at the conclusions of the extreme movements, respective, of the said movable element for rendering the switch means effective and ineffective;
(F) and means actuated by the movable element intermediate the extreme movements thereof, and prior to rendering the switch means ineffective to disconnect the coil element from said source of current, for decreasing the flow of current to said coil element.

5. A solenoid comprising in combination:
(A) A base;
(B) an electromagnetic element including a plurality of coils;
(C) a single element having a plurality of core arms, each being disposed in cooperative relationship, respectively, with one of the coils; one of said elements being fixed to the base and the other element being movable relative to the base and in cooperative relationship with said one element;
(D) switch means for connecting the electromagnetic element with a source of current;
(E) means on the movable element and actuated at the conclusions of the extreme movements, respective, of the said movable element for rendering the switch means effective and ineffective;
(F) and means actuated by the movable element intermediate the extreme movements thereof and prior to rendering the switching means ineffective, for disconnecting the electromagnetic element from said source of current, for changing the coil connection from parallel circuit connection to series circuit connection.

6. A solenoid comprising in combination:
(A) A base;
(B) an electromagnetic element including a plurality of electromagnetic coils, each coil having an arcuately shaped opening for a core arm;
(C) a single element having a plurality of arcuately shaped core arms, the arcuate shape in the openings in the coils and the arcuate shape of the arms being substantially about the same center, one of said elements being fixed in the base;
(D) pivotal means for supporting the other of said elements on the base in mating relationship of the arms and the openings, said other element being movable about said pivotal means in one direction when the coils are energized and released for movement in the opposite direction when the coils are de-energized;

(E) switch means for connecting the coils with a source of current;

(F) means on the movable element and actuated at the conclusions of the extreme movements, respective, of the said movable element for rendering the switch means effective and ineffective;

(G) and means actuated by the movable element intermediate the extreme movements thereof, and prior to rendering the switch means ineffective to disconnect the coils from said source of current, for decreasing the flow of current to said coils.

References Cited in the file of this patent

UNITED STATES PATENTS

| | | |
|---|---|---|
| 1,692,409 | Hobbs | Nov. 20, 1928 |
| 1,733,872 | Graseby | Oct. 29, 1929 |
| 2,449,901 | Kaiser | Sept. 21, 1948 |
| 2,636,095 | Schulte | Apr. 21, 1953 |